(12) United States Patent
Wisniewski

(10) Patent No.: US 6,340,180 B1
(45) Date of Patent: Jan. 22, 2002

(54) RELEASABLE COUPLING ASSEMBLY FOR SECURING A VEHICLE FUEL LINE

(76) Inventor: David M. Wisniewski, 15762 Clair Ct., Macomb Township, MI (US) 48042

(*) Notice: Subject to any disclaimer, the term of this patent is extended or adjusted under 35 U.S.C. 154(b) by 0 days.

(21) Appl. No.: 09/610,724

(22) Filed: Jul. 6, 2000

Related U.S. Application Data

(63) Continuation-in-part of application No. 09/232,791, filed on Jan. 19, 1999.

(51) Int. Cl.$^7$ .............................................. F16L 39/00
(52) U.S. Cl. .................................................... 285/319
(58) Field of Search ........................................ 285/319

(56) References Cited

U.S. PATENT DOCUMENTS

| | | | |
|---|---|---|---|
| 1,851,404 A | | 3/1932 | Rose |
| 4,697,832 A | | 10/1987 | Dickirson |
| 4,802,697 A | * | 2/1989 | Bartholomew .............. 285/319 |
| 5,033,513 A | * | 7/1991 | Bartholomew .............. 138/109 |
| 5,067,754 A | * | 11/1991 | Bartholomew .............. 285/319 |
| 5,094,481 A | | 3/1992 | Takikawa et al. |
| 5,100,182 A | * | 3/1992 | Norkey et al. .............. 285/318 |
| 5,131,691 A | * | 7/1992 | Washizu ..................... 285/319 |
| 5,161,834 A | * | 11/1992 | Norkey ....................... 285/319 |
| 5,178,424 A | * | 1/1993 | Klinger ...................... 285/319 |
| 5,309,609 A | | 5/1994 | Janiszewski et al. |
| 5,324,082 A | * | 6/1994 | McNaughton et al. ........ 285/93 |
| 5,378,025 A | | 1/1995 | Szabo |
| 5,415,825 A | * | 5/1995 | Sellers ....................... 264/262 |
| 5,485,982 A | * | 1/1996 | Gunderson ............... 251/149.6 |
| 5,499,848 A | | 3/1996 | Kujawski |
| 5,518,276 A | | 5/1996 | Gunderson |
| 5,533,761 A | | 7/1996 | Ostrander et al. |
| 5,536,047 A | | 7/1996 | Detable et al. |
| 5,573,279 A | * | 11/1996 | Rea et al. .................. 285/21.1 |
| 5,607,190 A | * | 3/1997 | Exandier et al. .............. 285/93 |

(List continued on next page.)

*Primary Examiner*—B. Dayoan
*Assistant Examiner*—Carlos Lugo
(74) *Attorney, Agent, or Firm*—Gifford, Krass, Groh Sprinkle, Anderson & Citkowski, P.C.

(57) ABSTRACT

A releasable coupling assembly for use within a vehicle fuel line including a first elongate and internally hollowed tubular member exhibiting an annular projecting lip from an exterior surface of the first tubular member and at a specified distance from an exposed end. A second elongate and internally hollowed tubular member terminating at one end in a longitudinally extending receptacle portion which is communicable with the second tubular member. The receptacle portion having an annular side wall and an annular end wall defining an open interior and capable of receiving the exposed end of the first tubular member an axially inserted distance. A retainer clip includes an apertured base and first, second and third circumferentially arrayed and deflectable legs. Each of the legs further includes a straight portion and a reverse angled bend portion. The retainer clip is mounted within the receptacle portion in axially inserting fashion such that, upon subsequent longitudinal insertion of the first tubular member, the annular lip causes reverse angled bend portions to outwardly deflect and to then inwardly deflect to fixedly abut a shoulder of the lip and to secure the annular lip between the reverse bend portions and the end wall. Each of the straight portions of the retainer clip further include a tang portion secured to the straight portions and extending in a direction towards an exposed end of the receptacle portion. An equal plurality of windowed portions being formed through said annular side wall of said receptacle portion at selected circumferential locations corresponding with each tang portion and seating said tang portions so that, upon subsequent withdrawal of said first tubular member, the tang portions prevent disengagement of the retainer clip from within the receptacle portion.

12 Claims, 1 Drawing Sheet

U.S. PATENT DOCUMENTS

| | | | | |
|---|---|---|---|---|
| 5,609,370 A | * | 3/1997 | Szabo et al. | 285/319 |
| 5,628,531 A | | 5/1997 | Rosenberg et al. | |
| 5,700,040 A | | 12/1997 | Kujawski | |
| 5,722,696 A | | 3/1998 | Taneya | |
| 5,725,258 A | | 3/1998 | Kujawski | |
| 5,752,726 A | | 5/1998 | Fixemer | |
| 5,769,462 A | | 6/1998 | Angell | |
| 5,779,278 A | * | 7/1998 | Grooters et al. | 285/93 |
| 5,785,358 A | | 7/1998 | Kujawski et al. | |
| 5,806,898 A | * | 9/1998 | Hollnagle | 285/86 |
| 5,992,903 A | | 11/1999 | Bartholomew | |
| 6,068,303 A | * | 5/2000 | Hollnagle | 285/319 |
| 6,152,496 A | * | 11/2000 | Kouda | 285/316 |
| 6,186,561 B1 | * | 2/2001 | Kaishio et al. | 285/319 |

\* cited by examiner

RELEASABLE COUPLING ASSEMBLY FOR SECURING A VEHICLE FUEL LINE

CROSS REFERENCE TO RELATED APPLICATIONS

The present application is a continuation-in-part of U.S. Ser. No. 09/232,791, filed Jan. 19, 1999, for a releasable coupling assembly for securing a vehicle fuel line.

BACKGROUND OF THE INVENTION

1. Field of the Invention

The present invention relates generally to fuel line coupling assemblies and, more particularly, to a vehicle coupling assembly for use in interconnecting an exposed end of a stainless steel tubing with a plastic fuel line.

2. Description of the Prior Art

Quick connect and releasable coupling assemblies are well known in the art for use with vehicle fuel lines and the like. The purpose of such assemblies is to provide a means for quickly and conveniently establishing a fuel tight connection between a first elongate tubular member and a second similar such member terminating in a fitting, such members often being constructed of differing materials.

U.S. Pat. No. 5,769,462, issued to Angell, teaches a coupling for releasably engaging a tubular member. The coupling illustrates a hollow body within which is received a tubular member. A sleeve is movable axially within the hollow body and is provided with an array of spacially separated holes and rotatable gripping members located in the holes for selectively engaging the outer surface of the tubular member. The rotatable gripping members move away from the outer surface of the tubular member during insertion of the tubular member into the hollow body. Movement of the tubular member in the opposite direction causes the rotatable gripping members to be cammed into contact with the surface of the tubular member.

U.S. Pat. No. 5,533,761, issued to Ostrander et al., teaches a further variation of a release member for a quick connector engageable with a fitting. The release member includes a body formed of a resilient material and having first and second end portions. A slot extends longitudinally through the first and second end portions for mounting of the release member over the fitting and to enable axial sliding movement of the release member through an open end of the quick connector into engagement with a retainer mounted within the quick connector and so as to effectuate release of legs of a retainer from an annular flange on the fitting and disengagement of the connector from the fitting. A radially enlarged flange is formed between the first and second end portions to form a tool engageable surface on the body for forcible sliding movement of the body into the open end of the connector. Alternatively, a recess or a projection may be provided on the body to form the tool engageable surface.

A still further example of a release member for a quick-type connector is illustrated in U.S. Pat. No. 5,378,025, issued to Szabo, which discloses an outer sleeve concentrically disposed about an inner sleeve and integrally joined to the inner sleeve at one end. A plurality of circumferentially spaced fingers are formed on the inner sleeve and extend axially from an opposite end of the inner sleeve. Radially outward extending projections are formed on the inner sleeve and engage an inward extending flange on a female connector part to retain the release member in the open end of a bore in the female connector part. The outer sleeve is slidably disposed over the tubular end portion of the female connector part. Engaging surfaces formed between the fingers on the inner sleeve engage deflectable legs on a retainer mounted in the bore of the female connector part when the release member is forcibly urged into the bore in the female connector part to deflect the legs radially outwardly so as to permit separation of a radially expanded flange on a male conduit from the female connector part.

SUMMARY OF THE PRESENT INVENTION

The present invention is a releasable coupling assembly which is an improvement over the prior art in that it provides for releasable engagement of a first tubular member within a receptacle portion, a further tubular member extending from an opposite end of the receptacle portion, and further provides an improved structure for fixedly securing a retaining clip within the receptacle portion. The first internally hollow and tubular member includes an annular lip projecting from an exterior surface of the first member at a longitudinally spaced location from an exposed end. The receptacle portion extends longitudinally and is typically joined or integrally formed with the second tubular member so that a continuous conduit is formed between the first and second tubular members.

The receptacle portion includes an annular side wall and an annular end wall and defines and open interior which is capable of receiving the exposed end of the first tubular member an axially inserted distance. A plurality of fluid-sealing O-rings are provided at spaced locations within the receptacle portion and proximate the longitudinally extending end of the first tubular member. The O-rings sealingly engage the inlet of the receptacle portion from the fluid flow passing through the outlet of the first tubular member and ensure that fluid flow is communicated in the downstream direction only of the second tubular member extending from the receptacle portion.

A retainer clip includes a base and a plurality of first, second and third circumferentially arrayed and deflectable legs integrally formed with and extending from the base. Each of the legs includes a longitudinally extending straight portion and a reverse angled bend portion, a circular aperture of sufficient dimension being formed through the base to permit the first tubular member to pass therethrough.

The retainer clip is capable of being mounted within the opening of the receptacle portion in an axially inserting fashion such that, upon subsequent longitudinal insertion of the first tubular member, the annular lip causes an outward deflection of each of the reverse bend portions. Concurrently, the O-rings mounted at the downstream location and within the interior of the receptacle housing sealingly engage the longitudinally inserted and extending end of the first tubular member with the second tubular member.

The reverse bend portions of the retainer clip subsequently inwardly deflect after longitudinal passage of the annular lip and abut against a shoulder of the annular lip so as to secure the lip between the reverse bend portions and the end wall. Each of the straight portions of the retainer clip further include a tang portion secured to the straight portion and extend in a direction towards an exposed end of the receptacle portion. A like plurality of windowed portions are formed through the annular side wall of the receptacle portion at selected circumferential locations corresponding with the tang portions such that, upon insertion of the retainer clip, the tang portions deflect in outwardly angled fashion so as to seat within the corresponding windowed portions.

The tang portions prevent disengagement of the retainer clip from within the receptacle portion upon subsequent withdrawal of the first tubular member. A releasing mechanism permits the first tubular member to be disengaged from the retainer clip within the receptacle portion and second extending tubular member. The releasing mechanism includes an axially translatable disk portion with a particularly configured forward edge and which is slidably mounted upon the first tubular member. Upon sliding the disk portion in a direction towards the receptacle portion, the forward edge engages the reverse angled bend portions and outwardly deflects the bend portions a sufficient angle to permit the annular lip to be reversibly translated along with the disk portion and the first tubular member withdrawn from within the receptacle portion.

An additional feature discloses a plurality of first, second and third recesses formed within the annular side wall of the receptacle portion. The recesses extend in an axial direction from the exposed end, in communication with the open interior of the receptacle portion, and correspond in circumferential location with the location of the windowed portions. Each of the axially extending recesses correspond in dimension and placement with the longitudinally extending straight portions of the retainer clip and provide guides for inserting the retainer clip within the receptacle portion.

BRIEF DESCRIPTION OF THE DRAWINGS

Reference now be had to the attached drawings, when read in combination with the following specification, wherein like reference numerals refer to like parts throughout the several views, and in which.

DETAILED DESCRIPTION OF THE PREFERRED EMBODIMENT

Figure 2:
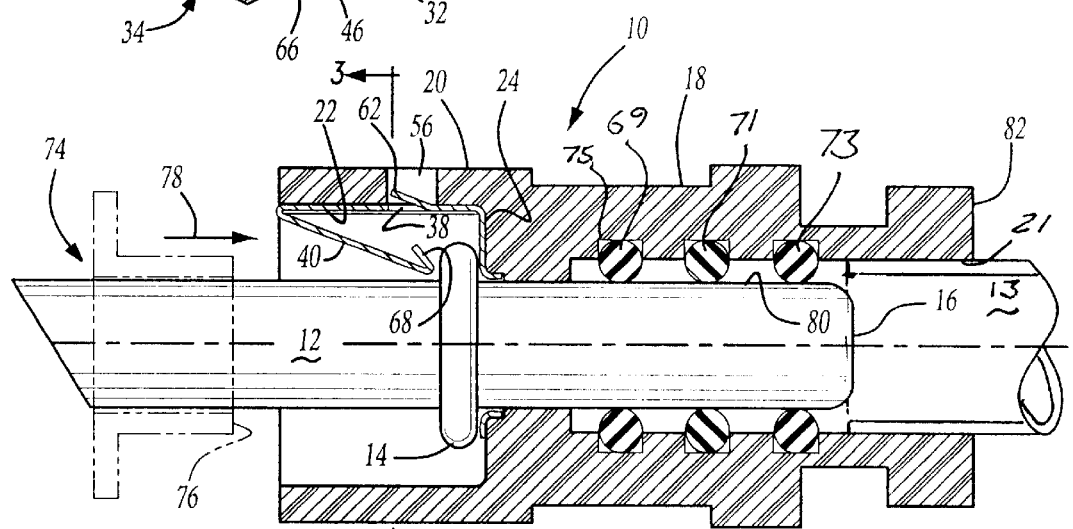
FIG. 2 is a planar cutaway view illustrating the releasably securing nature of the first tubular member within the receptacle portion and retainer clip and further showing the O-rings for sealingly engaging the outlet of the first tubular member with the interior of the receptacle portion and the extending second tubular member.
Figure 3:
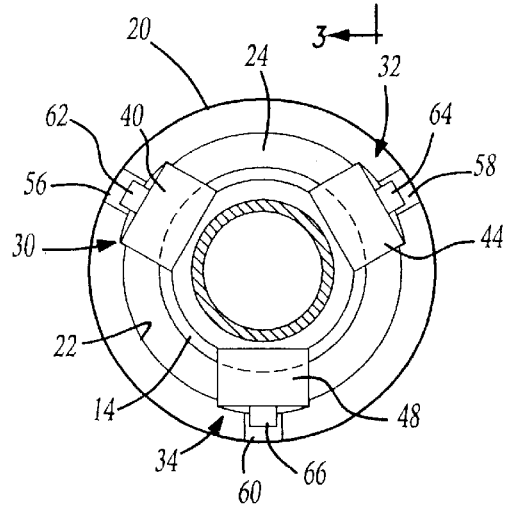
FIG. 3 is a cutaway end view taken along line 3—3 of FIG. 2 and illustrating the circumferential array of the deflectable legs of the retainer clip and its engagement with the annular lip of the first tubular member.

Reference being had to FIG. 2, the releasable coupling assembly is shown at 10 according to the preferred embodiment of the present invention for use with a vehicle fuel line. The coupling assembly includes a first elongate and internally hollowed tubular member 12, which is typically constructed of a stainless steel material, and a second elongate and tubular member 13. The first elongate tubular member 12 includes a projecting annular lip 14 which is located a desired longitudinally spaced distance from an exposed end 16 of the first tubular member 12.

Forming a part of the second elongate and internally hollowed tubular member 13 is a receptacle portion 18 which terminates at one end in an engagement portion 20 internally communicable with the second tubular member 18 and through which the first tubular member 12 is engaged. It is understood in the art that the second tubular member 13 and receptacle portion 18 may be constructed as one integral piece. Alternatively, the second tubular member 13 may be sealingly fitted within an end 21 of the receptacle portion 18 opposite the a receptacle portion 20, and it is further understood that the second tubular member 13, which is illustrated in cutaway and in reduced length, may extend any desired length beyond the receptacle portion 18 and extend to a further suitable component in the vehicle fuel system. The end 21 of the receptacle portion 18 comprises an end wall 82.

In the preferred embodiment, the first tubular member 12 is typically a stainless steel or aluminum composition and either or both the second tubular member 13 and receptacle portion 18 are typically constructed of a plasticized or other suitable synthetic material. It is understood however that the choice of materials utilized in the first tubular member 12, second tubular member 13 and receptacle portion 18 is dictated by requirements of the particular application. It has however been found that the construction of the receptacle portion 18, to be further explained, of the plasticized material is capable of being adequately and sealingly engaged with the first tubular member 12. As best illustrated in the cutaway of FIG. 2, the a receptacle portion 20, (of the receptacle portion 18) further includes an inwardly facing and annular side wall 22 which terminates in a recessed and annular end wall 24 defining an open interior and which is capable of receiving the inserting end of the first tubular member 12.

Figure 1:
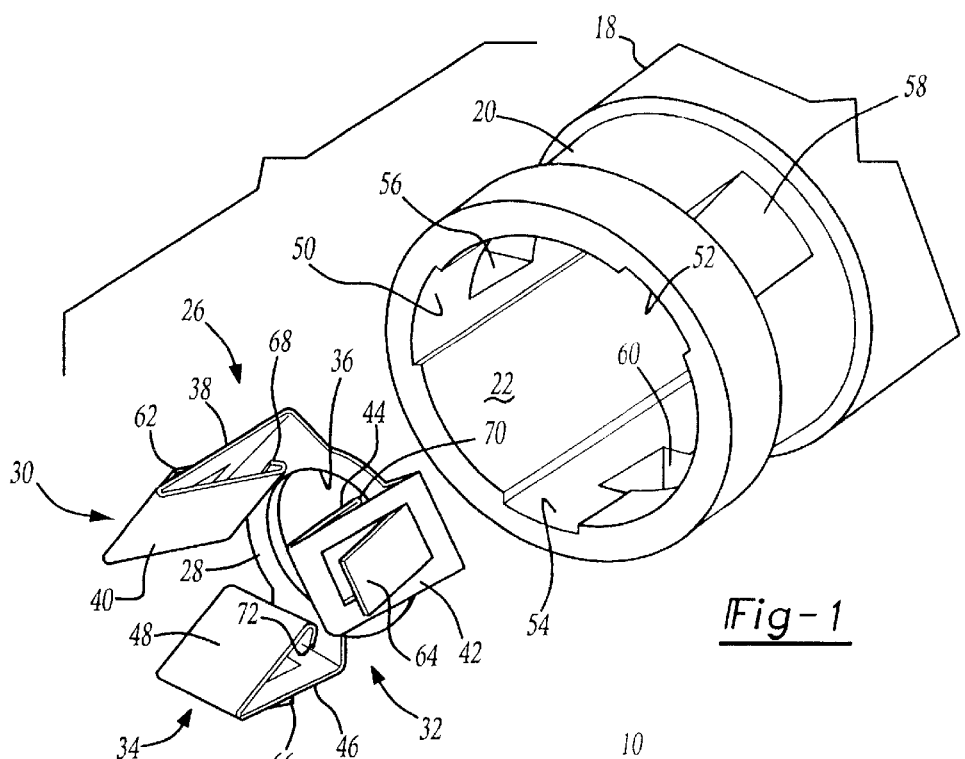
FIG. 1 is an exploded view of the releasable coupling assembly according to the present invention.

Referring also to FIG. 1, a retainer clip 26 is provided which is preferably constructed of a stainless steel material (or other material exhibiting the necessary properties of resiliency) and includes a base 28 and, according to the preferred embodiment, first 30, second 32 and third 34 deflectable legs which are integrally formed with and extend from the base 28. The base 28 further includes an annular inner wall 36 which defines a central aperture of sufficient dimension to permit the longitudinal insertion of the first tubular member 12 therethrough. Each of the deflectable legs 30, 32 and 34 further include a longitudinally extending straight portion and a reverse angled bend portion. Specifically, referring to FIG. 1, the first deflectable leg 30 includes a straight portion 38 and a reverse bend portion 40, the second deflectable leg 32 includes a straight portion 42 and a reverse bend portion 44, and the third deflectable leg 34 includes a straight portion 46 and a reverse bend portion 48.

Referring again to FIG. 1, the retainer clip 26 is capable of being mounted in an axially sliding fashion within the exposed end of the receptacle portion 20 and this is facilitated by recesses 50, 52 and 54 which are defined within the annular extending side wall 22 by recessed wall surfaces and which extend a selected distance in an axial direction from the exposed end and in communication with the open interior. First, second and third windowed portions 56, 58 and 60 are formed through the annular side wall 22 of the receptacle portion and correspond in circumferential location with the first, second and third deflectable legs 30, 32 and 34, respectively. The recesses 50, 52, and 54 are preferably about 0.025 inches in depth and extend beyond the windowed portions so as to provide guides for locating the deflectable legs prior to the retainer clip 26 being axially inserted within the open interior of the receptacle portion 20.

Means for fixedly securing the retainer clip 26 within the receptacle portion 20 are also provided in the form of first 62, second 64 and third 66 tang portions which are secured to the straight portions 38, 42, and 46, respectively, and which extend in a direction towards the exposed end of the receptacle portion. The tang portions 62, 64 and 66 outwardly actuate to seat within the windowed portions 56, 58 and 60 upon the retainer clip 26 being slidably engaged through the open interior of the receptacle portion 20 and this is best shown by the tang portion 62 of first deflectable leg 30 seatingly engaged within the windowed portion 56 in the cutaway of FIG. 2.

Referring again to FIG. 2, the manner of sealingly engaging the first tubular member 12 within the receptacle portion 18, and likewise to the second tubular member 13, is disclosed and includes the axial insertion of the first tubular member 12, between and past the annular side wall 22 of the a receptacle portion 20, thus causing the annular lip 14 to outwardly deflect the reverse angled bend portions (see bend portion 40 of first deflectable leg 30 in FIG. 2). The reverse bend portions (again illustrating bend portion 40 of FIG. 2) respond after axial passage of the annular lip 14 by re-expanding in an inwardly deflecting direction to abut against a shoulder of the annular lip 14 so as to secure the annular lip between the reverse bend portions and the end wall 24 of the receptacle portion. To facilitate smooth transition of the reverse angled bend portions, each of the angled bend portions further includes an outwardly curled exposed edge. Specifically, curled edges 68, 70 and 72 are provided for deflectable legs 30, 32 and 34, respectively, (see FIG. 1).

As best shown in FIG. 2, the extending end length of the first tubular member 12, referenced at 80 and extending up to the end 16, extends into the open interior of the receptacle portion 18 leading to the second tubular member 13. The exposed end 16 of the first tubular member 12 is sealingly engaged with the receptacle portion 18 and the attached and extending second tubular member 13 by a plurality of O-rings 69, 71 and 73. Each of the O-rings 69, 71 and 73 is secured in place within a corresponding recess, see at 75 for O-ring 69, formed within the receptacle portion 18 and to maintain the O-rings in position during insertion and removal of the first tubular member 12. As again is best illustrated in the internal cutaway of FIG. 2, the O-rings 69, 71 and 73 sealingly engage the outlet end 16 of the first tubular member 12 and ensure that no fluid leaks past the annular end wall 24 and in a reverse direction towards the inlet end of the receptacle portion 18. Rather, fluid flow proceeds from the first tubular member 12 to the adjoining and extending second tubular member 13 as illustrated.

A mechanism for releasably securing the first tubular member 12 from the retainer clip 26 and within the receptacle portion 18 is disclosed by an axially translatable disk portion 74 which is slidably mounted upon the exterior facing surface of the first tubular member 12 and which includes a forward edge 76. The disk portion 74 is moved in a direction illustrated by arrow 78 in FIG. 2 and up to the point in which the forward edge 76 engages with the reverse angled ben portions of the retainer clip 26, causing the reverse bend portions 40, 44 and 48 to be outwardly deflected to the point in which the lip 14 is capable of being reverse translated and the first tubular member 12 withdrawn.

Having described my invention, it will be apparent that other embodiments will become obvious to those skilled in the art to which it pertains without deviating from the scope of the appended claims. Specifically, a retainer clip exhibiting any other plurality of deflectable legs may be provided, such as two, four or some other number, with a likewise plurality of windowed portions, tang portions and the like. The material construction of the first and second tubular members may also be altered to suit a desired application.

I claim:

1. A releasable coupling assembly comprising:
   a first elongate and internally hollowed tubular member, an annular lip projecting from an exterior surface of said first tubular member at a longitudinally spaced location from an exposed end;
   a second elongate and internally hollowed tubular member, said second tubular member terminating at one end in a longitudinally extending receptacle portion internally communicable with said second tubular member, said receptacle portion having an annular side wall and an annular end wall defining an open interior and capable of receiving said exposed end of said first tubular member an axially inserted distance and in a fluid sealing manner; a retainer clip including a base and a plurality of circumferentially arrayed and deflectable legs integrally formed with and extending from said base, each of said legs including a longitudinally extending straight portion and a reverse angled bend portion, a circular aperture of sufficient dimension being formed through said base to permit said first tubular member to pass therethrough;
   said retainer clip capable of being mounted within said receptacle portion in axially inserting fashion such that, upon subsequent longitudinal insertion of said first tubular member, said annular lip causing an outward deflection of said reverse angled bend portions, said reverse bend portions inwardly deflecting after longitudinal passage of said annular lip and abutting against a shoulder of said annular lip so as to secure said annular lip between said reverse bend portions and said end wall; and each of said straight portions of said retainer clip further including a tang portion secured to said straight portion and extending in a direction towards an exposed end of said receptacle portion, a like plurality of windowed portions being formed through said annular side wall of said receptacle portion at selected circumferential locations corresponding with said tang portions such that, upon insertion of said retainer clip, said tang portions deflect in outwardly angled fashion so as to seat within said corresponding windowed portions, said tang portions preventing disengagement of said retainer clip from within said receptacle portion upon subsequent withdrawal of said first tubular member.

2. The releasable coupling assembly according to claim 1, further comprising means for releasing said first tubular member from within said receptacle portion.

3. The releasable coupling assembly according to claim 2, said releasing means further comprising an axially translatable disk portion slidably mounted upon said first tubular member, said disk portion including a forward edge which, upon sliding engagement with said reverse angled bend portions of said retainer clip, outwardly deflects said bend portions a sufficient angle to permit said annular lip to be reversibly moved and said first tubular member withdrawn.

4. The releasable coupling assembly according to claim 1, further comprising a plurality of recesses formed within said annular side wall of said receptacle portion, said recesses extending in an axial direction from said exposed end and in communication with said open interior and corresponding in circumferential location with said windowed portions, each of said axially extending recesses corresponding in dimension and placement with said longitudinally extending straight portions of said retainer clip.

5. The releasable coupling assembly according to claim 1, said longitudinally spaced distance between said annular lip and said exposed end of said first tubular member extending beyond said annular end wall of said receptacle portion and into said communicating second tubular member.

6. The releasable coupling assembly according to claim 5, further comprising a plurality of O-rings located within said receptacle portion and sealingly engaging around said exposed end of said first tubular member to prevent fluid flow in a reverse direction towards said annular lip.

7. The releasable coupling assembly according to claim 1, further comprising said first tubular member being constructed of a stainless steel tubing material.

8. The releasable coupling assembly according to claim 1, further comprising said receptacle portion being constructed of a plasticized material.

9. The releasable coupling assembly according to claim 4, further comprising each of said axially extending recesses establishing a depth of 0.025 inches.

10. The releasable coupling assembly according to claim 1, further comprising exposed edges of said reverse angled bend portions being outwardly curled.

11. The releasable coupling assembly according to claim 1, said retainer clip being constructed of a stainless steel material.

12. A releasable coupling assembly for use within a vehicle fuel line, said coupling assembly comprising:

a first elongate and internally hollowed tubular member constructed of a stainless steel material, an extruded annular lip projecting from an exterior surface of said first tubular member at a selected longitudinally spaced location from an exposed end; a second elongate and internally hollowed tubular member constructed of a plasticized material, said second tubular member terminating at one end in a longitudinally extending receptacle portion internally communicable with said second tubular member, said receptacle portion having an annular side wall and an annular end wall defining an open interior and capable of receiving said exposed end of said first tubular member an axially inserted distance and in a fluid sealing manner;

a retainer clip including a base and a plurality of first, second and third circumferentially arrayed and deflectable legs integrally formed with and extending from said base, each of said legs including a longitudinally extending straight portion and a reverse angled bend portion, a circular aperture of sufficient dimension being formed through said base to permit said first tubular member to pass therethrough;

said retainer clip capable of being mounted within said receptacle portion in axially inserting fashion such that, upon subsequent longitudinal insertion of said first tubular member, said annular lip causing an outward deflection of said reverse angled bend portions, said reverse bend portions inwardly deflecting after longitudinal passage of said annular lip and abutting against a shoulder of said annular lip so as to secure said annular lip between said reverse bend portions and said end wall; and each of said straight portions of said retainer clip further including a tang portion secured to said straight portion and extending in a direction towards an exposed end of said receptacle portion, a like plurality of first, second and third windowed portions being formed through said annular side wall of said receptacle portion at selected circumferential locations corresponding with said tang portions such that, upon insertion of said retainer clip, said tang portions deflect in outwardly angled fashion so as to seat within said corresponding windowed portions, said tang portions preventing disengagement of said retainer clip from within said receptacle portion upon subsequent withdrawal of said first tubular member.

* * * * *